United States Patent [19]
Vanderveen

[11] 3,864,455
[45] Feb. 4, 1975

[54] CARBON BLACK STRUCTURE REDUCTION USING A URANIUM ADDITIVE
[75] Inventor: John W. Vanderveen, Bartlesville, Okla.
[73] Assignee: Phillips Petroleum Company, Bartlesville, Okla.
[22] Filed: Oct. 10, 1972
[21] Appl. No.: 295,827

[52] U.S. Cl. .................. 423/450, 106/307
[51] Int. Cl. .................. C01b 31/02, C08h 17/08
[58] Field of Search .................. 423/450–458, 423/459, 460, 461; 106/307

[56] References Cited
UNITED STATES PATENTS

| | | | |
|---|---|---|---|
| 3,010,794 | 11/1961 | Friauf et al. | 106/307 X |
| 3,010,795 | 11/1961 | Friauf et al. | 106/307 X |
| 3,206,285 | 9/1965 | Johnson | 423/450 X |
| 3,222,202 | 12/1965 | Jordan et al. | 423/450 X |
| 3,306,762 | 2/1967 | Ruble | 106/307 |
| 3,330,679 | 7/1967 | Jordan et al. | 106/307 |
| 3,383,175 | 5/1968 | Jordan et al. | 423/453 |
| 3,494,740 | 2/1970 | Speck | 423/450 X |

OTHER PUBLICATIONS
Carbon Black Abstracts, vol. 14, no. 3/4, Aug.–Dec. 1965, pages 3 & 4.

Primary Examiner—Oscar R. Vertiz
Assistant Examiner—Hoke S. Miller

[57] ABSTRACT

Structure of carbon black is reduced by the addition of uranium to the carbon black forming zone.

8 Claims, 3 Drawing Figures

PATENTED FEB 4 1975
3,864,455
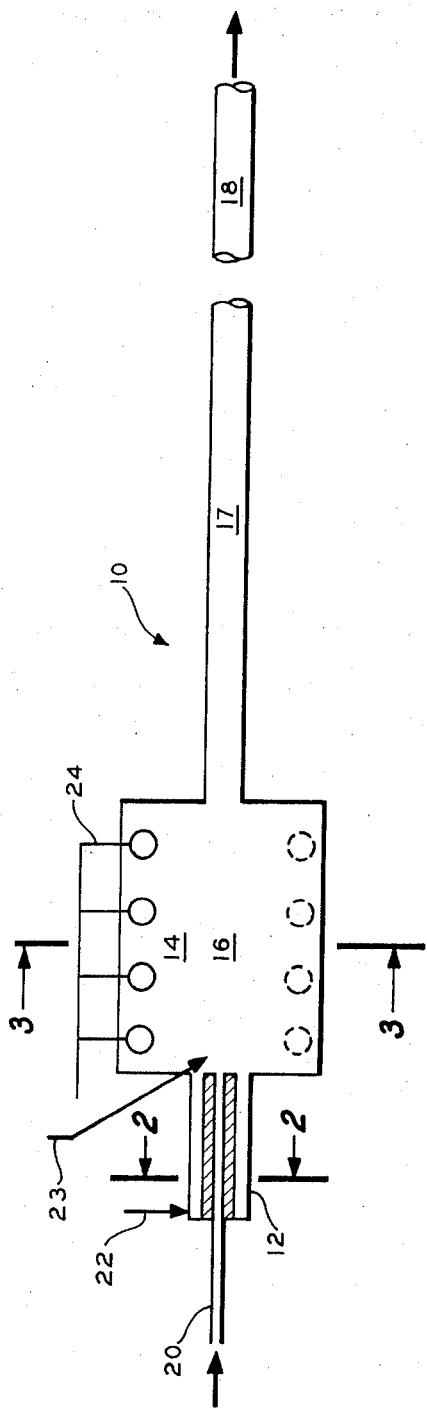
FIG. 1
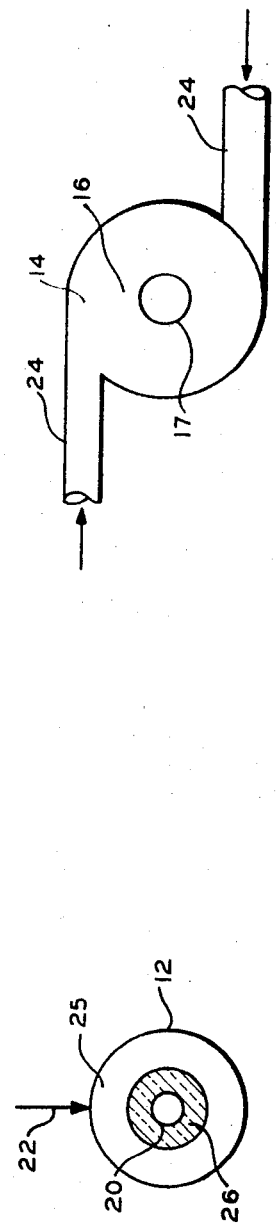
FIG. 3
FIG. 2

CARBON BLACK STRUCTURE REDUCTION USING A URANIUM ADDITIVE

BACKGROUND OF THE INVENTION

This invention relates to the production of low structure carbon black.

Potassium compounds are known to have a substantial effect on the properties of the resulting carbon black when added to a carbon black forming zone. Other materials, including sodium salts, are less effective or exhibit such slight activity as to require concentrations too high to be commercially acceptable for some applications. Thus the art is in need of another class of compounds having a high degree of effectiveness in reducing the structure of carbon black when used in relatively low concentrations.

BRIEF SUMMARY OF THE INVENTION

It is an object of this invention to produce carbon black having improved properties;

It is a further object of this invention to produce carbon black having lower structure; and It is yet a further object of this invention to reduce the structure of carbon black utilizing a relatively small amount of an additive.

In accordance with this invention uranium is added to the carbon black forming zone.

BRIEF DESCRIPTION OF THE DRAWINGS

In the drawings, forming a part hereof, wherein like reference characters denote like parts of the various views FIG. 1 indicates schematically one reactor configuration for carrying out the invention;

FIG. 2 is a cross-sectional view along lines 2—2 of FIG. 1; and

FIG. 3 is a cross-sectional view through lines 3—3 of FIG. 1.

DESCRIPTION OF THE PREFERRED EMBODIMENTS

The use of uranium to reduce the structure of carbon black can be applied to any carbon black reactor using a fluid hydrocarbon feed. It is particularly applicable to reactors utilizing tangential introduction of hot combustion gases into a precombustion zone. Suitable process and apparatus are shown in Krejci U.S. Pat. No. 2,564,700 issued Aug. 21, 1951, the disclosure of which is incorporated by reference.

The invention is applicable to the use of any conventional carbon black feed, and is of particular utility with conventional oil feeds such as highly aromatic hydrocarbons.

It is essential that the uranium be present in the carbon black forming zone in order to produce carbon black of decreased structure as compared with the carbon black produced under the same conditions without the use of uranium. However, it can be added in any manner such as by way of the hydrocarbon feed, with any fuel gas which is utilized, with the air, or simply by a separate conduit into the carbon black forming zone. The urnaium can be added continuously or intermittently. In the intermittent operation the introduction of the uranium compound can be ceased for a period of time equal to or greater than the period of time it is introduced.

The uranium can be added as metallic uranium or as a compound. Suitable compounds of uranium include the oxides such as $UO_2$, $U_3O_8$, etc., and compound which react to form uranium oxide in the reactor such as uranyl acetate, $UO_2(OOCCH_3)_2 \cdot 2H_2O$, uranyl nitrate, $UO_2(NO_3)_2 \cdot 6H_2O$, and uranyl perchlorate $UO_2(ClO_4)_2 \cdot 6H_2O$. The nitrate and the like, being soluble, can be introduced as an aqueous solution.

The invention is particularly directed to the formation of furnace black having a reduced structure produced at temperature of at least 1,700°F.

The uranium or compound of uranium can be added in an amount to give 1–1000, preferably 30-500 parts by weight of uranium per million parts by weight of hydrocarbon feed.

Referring now to the drawings there is shown apparatus for carrying out a process for making carbon black by the thermal decomposition of a fluid hydrocarbon feed in a carbon black forming zone at a temperature of greater than 1,700°F. In FIG. 1, there is shown a reactor 10 having an initial axial zone 12, a precombustion zone 14, a combustion zone 16, a reaction zone 17, and a quench zone 18. Feed is introduced axially via line 20 with fuel gas being introduced via line 22. Air is introduced tangentially via four sets of entries 24. Uranium is added via line 23.

Referring now to FIG. 2 there is shown in detail a sectional view of initial axial zone 12 containing the fuel gas is annulus 25, feed line 20 having insulation 26 there around.

FIG. 3 shows a sectional view of the combustion zone showing the entry of tangential air via lines 24. Because FIG. 3 is a view in the direction of the downstream portion of the reactor the smaller reaction zone 17 is shown.

Many conventional parts have been omitted for the sake of simplicity but their inclusion is understood by those skilled in the art and it is within the scope of the invention.

EXAMPLE

A reactor identical to that shown in the drawings was utilized. This reactor had an initial axial zone of 4 inches in length, a precombustion zone of 8 inches in length, and a reaction zone 34 inches in length to the point of quench addition. The feed line was ⅛ inch internal diameter having an annular insulation therearound with a total diameter of one-half inch. The internal diameter of the initial axial zone was 1 inch giving an annulus of one-fourth inch for the fuel gas. The precombustion and combustion zone had a total diameter of 4 inches with the reactor having an internal diameter of one-half inch.

The reaction was carried out utilizing benzene as the feed at a temperature between 1,800 and 2,200°F. Uranyl nitrate, $UO_2(NO_3)_2 \cdot 6H_2O$ in an aqueous solution was added via a line entering near the feed and entry into the combustion zone. The results were as follows.

|  | With "U" | Without "U" |
|---|---|---|
| Benzene Feed, cc/min | 6 | 6 |
| Axial Fuel (CH₄), scf/min | 0.28 | 0.28 |
| Tangential Air, scf/min | 4.1 | 4.1 |
| Air/Fuel Gaseous Vol. Ratio | 14.6:1 | 14.6:1 |
| "Uranium" PPM by Wt. of Benzene | 300 | 0 |

|  | With "U" | Without "U" |
|---|---|---|
| Product Carbon Black: | | |
| [1]DBP, cc/100 gm | 206[2] | 235 |

Used uranyl nitrate $UO_2(NO_3)_2 \cdot 6H_2O$ as aqueous solution added to reaction zone.

[1]DBP by ASTM 2414-65T.
[2]Average of 4 values ranging 197 to 214.

The introduction of uranium compound was terminated. However, the resulting carbon black continued to have a low structure with the structure being 216 after about 30 minutes. This illustrates that cyclic addition of the additive can be used. Thereafter on continued operation without addition of the uranium compound the structure returned to the control value of 235. Thus the uranium compound is effective at extremely low concentrations far below the 300 parts per million actually added.

While this invention has been described in detail for the purpose of illustration it is not to be construed as limited thereby but is intended to cover all changes and modifications within the spirit and scope thereof.

I claim:

1. In a process for making carbon black by the thermal decomposition of a fluid hydrocarbon feed in a carbon black forming zone at a temperature of greater than 1,700°F, the improvement comprising introducing into said zone from 1—1000 parts by weight of uranium per million parts by weight of feed.

2. A method according to claim 1 wherein said uranium is present in said carbon black forming zone in a concentration of 30—500 parts by weight per million parts by weight of feed.

3. A method according to claim 1 wherein said uranium is added in the form of uranyl nitrate.

4. A method according to claim 1 wherein said uranium is added intermittently.

5. A method according to claim 1 wherein said process for making carbon black comprises the axial introduction of feed into a combustion zone along with fuel gas, with air being introduced tangentially into a precombustion zone surrounding said combustion zone with the product thereafter going into a relatively long, smaller diameter reaction zone.

6. A method according to claim 5 wherein said uranium is added via a line entering near the feed entry.

7. A method according to claim 5 wherein said feed is benzene.

8. A method according to claim 1 wherein said uranium is present in said carbon black forming zone in a concentration of less than 300 parts by weight per million parts by weight of feed.

* * * * *